United States Patent [19]
Parry

[11] 3,962,733
[45] June 15, 1976

[54] ALL WEATHER SAFETY SHOWER
[75] Inventor: Edward Parry, New York, N.Y.
[73] Assignee: Thermal Conduction Engineering Corporation, Secaucus, N.J.
[22] Filed: Aug. 30, 1973
[21] Appl. No.: 392,992

[52] U.S. Cl. ............................................. 4/145
[51] Int. Cl.² ....................................... E03C 1/02
[58] Field of Search ............... 4/145, 166, 147, 148, 4/156, 194; 236/93 B; 137/59, 62, 301, 468; 128/248, 249

[56] References Cited
UNITED STATES PATENTS

| | | | |
|---|---|---|---|
| 382,820 | 5/1888 | Marshall | 137/301 |
| 1,248,573 | 12/1917 | Swimmer | 4/145 |
| 1,346,791 | 7/1920 | Triggs | 137/62 |
| 1,910,919 | 5/1933 | Hetherington | 4/145 |
| 2,021,145 | 11/1935 | Dyar | 4/145 |
| 3,222,690 | 12/1965 | Noakes | 4/194 |
| 3,274,619 | 9/1966 | Rolfes | 4/145 |
| 3,313,241 | 4/1967 | Newman | 137/301 |
| 3,599,251 | 8/1971 | Wright | 4/166 |

Primary Examiner—Richard E. Aegerter
Assistant Examiner—Stuart S. Levy
Attorney, Agent, or Firm—Howard E. Thompson, Jr.

[57] ABSTRACT

A safety shower adapted for reliable operation under all weather conditions is provided with strategically located bleed means for draining water from the shower, at least one of such bleed means including a temperature sensitive valve which permits limited flow of supply water upon the occurrence of predetermined ambient temperature conditions.

In temperature zones the temperature sensitive valve will be one responsive to near freezing temperatures, in equatorial zones the temperature sensitive valve will be one responsive to dangerously high water temperatures, and in intermediate and temperate zones both types of temperature sensitive valves may be employed.

Other bleed means is preferably employed to facilitate draining of water from portions of piping beyond the shower activating means when the shower is not in use.

10 Claims, 4 Drawing Figures

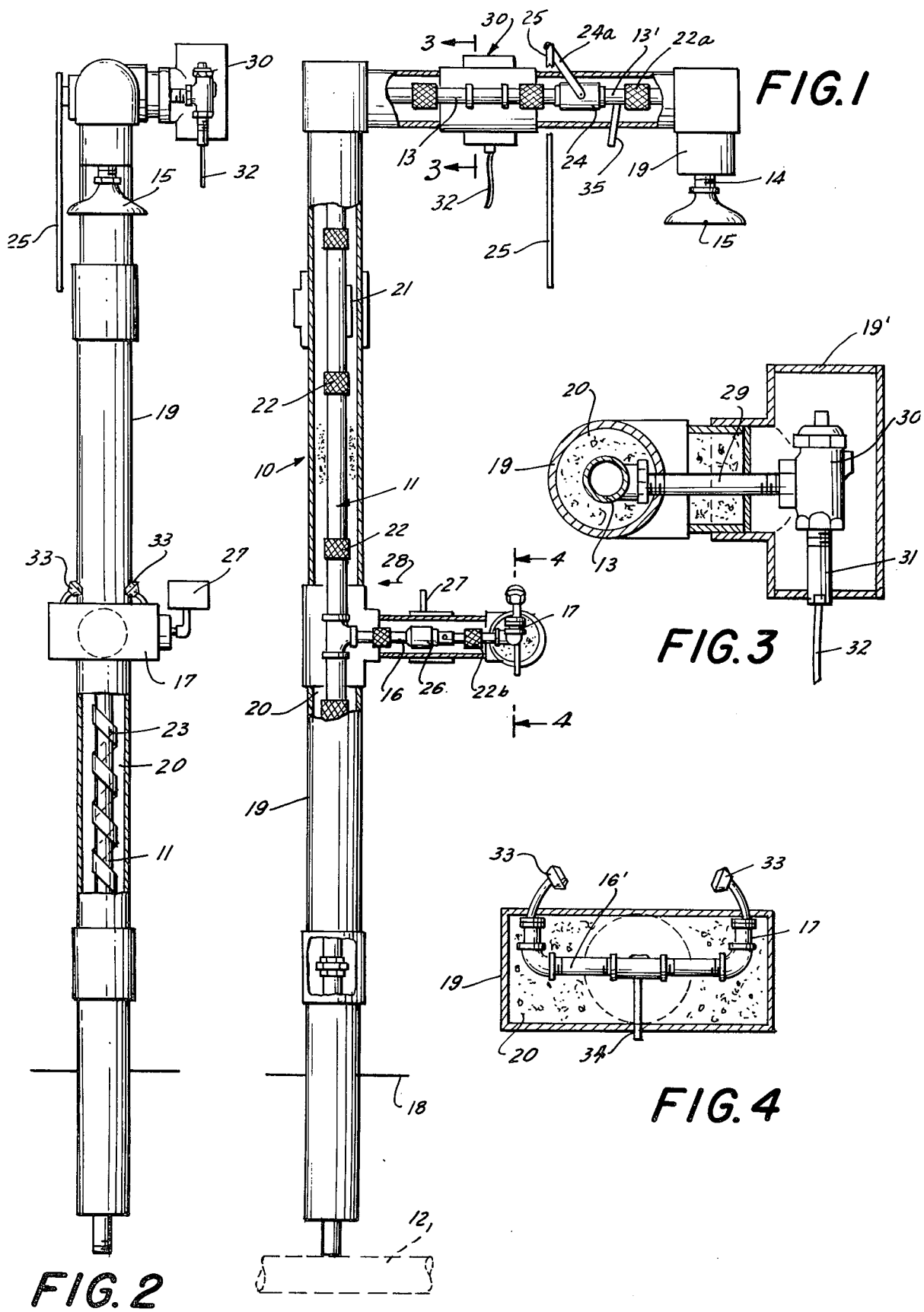

ALL WEATHER SAFETY SHOWER

This invention relates to improved safety showers of the type generally used in chemical and industrial areas wherein means is provided for assuring all weather dependability in the immediate and safe supply in water when needed. More particularly, the invention relates to safety showers, including those with eyewash facilities, wherein a plurality of strategically located bleed means are provided for draining water from the shower piping, at least one such bleed means including a temperature sensitive valve which permits limited flow of supply water upon the occurrence of predetermined ambient temperature conditions.

BACKGROUND OF THE INVENTION

Safety showers, preferably with eyewash facilities, are a must for many chemical and industrial installations where the effects of chemical spillage, flash fires and the like can be minimized if involved personnel can have immediate access to copius amounts of flowing fresh water. Many types of safety showers are in use, those in temperate and cooler zones generally being equipped with thermostatically controlled heating using electrical induction or resistance heating means, as disclosed, for example, in U.S. Pat. No. 3,274,619 issued Sept. 27, 1966, in order to assure continuing supply of water as the ambient temperature approaches, and drops below, the freezing point.

While heated safety showers have found wide acceptance, they are not entirely foolproof in that failure of electrical power, and hence inactivation of the heating means, can permit a freeze-up rendering the shower inoperative and possibly leading to major damage to the system.

In warmer climates, as in the southern portion of the United States the ambient temperature may reach the freezing point so infrequently that the provision of heated showers may not be economically prudent, yet a real problem can develop if a freak storm brings sub-freezing temperatures.

In such warmer climates, and in equatorial areas, another problem presents itself in that safety showers, even though provided with thermal insulation, may through exposure to direct sunlight develop dangerously high water temperature in the above-ground portion of the feed water piping. A safety shower belies its name if the critical surge of water when actuated is at near scalding temperature.

Thus it will be seen that safety showers at the present time fall far short of providing the all weather dependability which personnel in areas needing safety showers have every right to expect.

THE INVENTION

The improved safety shower of the present invention is believed to overcome these problems and shortcomings by providing a plurality of critically positioned bleed means in the shower piping including, closely adjacent and in advance of the main actuating valve, a temperature sensitive valve means which will permit a limited flow and discharge of feed water during the continuance of predetermined ambient temperature conditions. Other bleed means are located beyond the actuating valves for the main shower and/or eyewash to permit complete draining of the piping beyond the actuating valves when the apparatus is not in use.

In temperate and cooler zones the temperature sensitive valve will be one which opens as the freezing point is approached and will remain open as long as the ambient temperature remains near or below freezing. It is well known that flowing water, particularly as being replenished by water at a temperature well above the freezing point, is not likely to freeze, and hence the provisions of an appropriate flow through the bleed valve for the particular size installation during periods when ambient temperature is near or below freezing will assure proper functioning of the shower during this adverse condition.

In equatorial areas there may be no danger of freezing, but here the problem of overheating of water within the piping of a shower, particularly one exposed to full sunlight, becomes very real. In such locations, a temperature controlled bleed valve should be one which will open when the water temperature in the shower piping has reached some predetermined level, such as 120° to 150°F, and remain open until the hot water has been discharged and the temperature of water in the shower piping has returned to a safe level. This is a significant safety feature, as it frequently happens that water in safety showers in equatorial areas can, during extended periods of non-use, be heated almost to the boiling point, presenting a real hazard for one needing immediate use of the safety shower.

In some locations, such as southern portions of the United States, extremes of temperatures can be encountered with summer conditions frequently approaching equatorial conditions and freak winter storms producing sub-freezing conditions. In such locations, it can be desirable to provide a safety shower with both types of temperature sensitive bleed valves i.e., one which will periodically discharge overheated water in the shower piping, and one which will provide a continuing bleed flow of water during a freak cold spell.

Even in temperate and cooler areas, where electrically heated safety showers are normally employed, and the primary need is for a temperature sensitive bleed valve responsive to low temperatures as a safeguard in the event of failure of electric power, there can also be advantage in providing a second temperature sensitive valve responsive to high temperatures. This would prevent an accidental temperature buildup in the water of the shower piping in the event of malfunctioning (which can occur) in the thermostatic control of the heating means. In such instances, any evidence of discharge of water through the high temperature bleed valve would be a signal to maintenance personnel to investigate possible malfunction of the heating means thermostat.

The improved safety shower of the present invention will be more fully understood from a consideration of the following description having reference to the accompanying drawing in which preferred adaptations have been illustrated, with the various parts thereof identified by suitable reference characters in each of the views, and in which:

FIG. 1 is a side elevation view of a safety shower embodying features of the present invention with parts of the structure broken away and in section and illustrating one optional form of heating;

FIG. 2 is a view of the shower shown in FIG. 1 looking in the direction of the arrows 2—2 with part of the structure broken away to illustrate another optional form of heating;

FIG. 3 is an enlarged sectional view taken substantially on the line 3—3 of FIG. 1 and;

FIG. 4 is an enlarged sectional view taken substantially on the line 4—4 of FIG. 1.

As shown in the drawing, the safety shower 10 comprises a system of vertical piping 11 extending from a constant water supply line 12 to an elevated horizontal extension 13 terminating in a downwardly extending portion 14 and showerhead 15. At a convenient height the piping 11 communicates with other horizontal piping 16 terminating in an eyewash head 17. The piping extension 16 is preferably in vertical alignment with the upper extension 13 and the relative outward spacing from the piping 11 of the showerhead 15 and eyewash head 17 is preferably such that both wash facilities can be used concurrently when an emergency calls for each treatment.

The water source 12 is preferably located a sufficient distance below grade level 18 to be safe from freezing and protected from overheating in locations where the heat of direct sunlight can be excessive.

The entire piping system is encased in a tubular structure 19, suitably comprising metal, fiber glass or plastic tubing, of substantially larger diameter than the piping, and disposed substantially co-axially therewith, to provide a spacing 20 which can be filled with insulating material suitably in the form of plastic foam insulation.

For use in temperate and cooler zones where there is a danger of freezing temperatures being reached on a fairly regular basis, it is desirable that the piping 11, 13 and 16 be provided with heating means suitably in the form of electrical heating means controlled by a thermostat 21 embedded in the insulation 20 in close proximity to the piping. The electric heating can be of the induction type in which a plurality of induction heating coils 22 are arranged at spaced intervals throughout the piping as shown in FIG. 1, or the heating can be of the resistant type wherein the piping is associated with a longitudinal arrangement or wrapping of electric resistance means or tape 23 as shown in FIG. 2 of the drawing.

The elevated horizontal piping 13 is provided with a valve 24 having quick response actuating means such for example as a lever 24a and pull handle or actuator 25 linked thereto. It should be noted in this connection that in some emergency shower installations the actuator 25 is linked to a pivoted treadle (not shown) so that the valve 24 is open whenever anyone steps beneath the showerhead 15. Whether to use a hand actuator 25 or the treadle modification depends largely on the environment being serviced and the type of industrial accident likely to be encountered.

The horizontal piping 16 is also provided with a quick actuating valve 26 such for example as a ball valve having a protruding lever handle 27 which permits quick opening of the valve by pushing in the direction of the arrow 28 as shown in FIG. 1.

It will be noted that the heating means if present preferably extends to the portion of piping between valve 24 and showerhead 15 as indicated at 22a and also preferably extends to the piping between valve 26 and the eyewash head 17 as seen at 22b. It is to be understood, however, that the presence or absence of any heating means will depend on the locality in which the shower is to be installed; and in equatorial areas, where no danger of freezing can ever be encountered, the heating means would, of course, be completely eliminated.

A unique feature of the improved shower is the provision in a lateral extension 29 from the horizontal pipe 13, at a point closely adjacent the valve 24, of a temperature sensitive valve assemblage 30 having a discharge 31 which is preferably coupled with a short length of plastic hose or tubing 32. Temperature sensitive valves are not new per se but are available commercially, one source of supply being Ogontz Controls Company, Philadelphia, Pa. In temperature sensitive valves of this type a valve moving sensor, which is actuated by a few degrees of temperature change, can be set to function at various desired ranges of temperature change.

In one adaptation of the invention the temperature sensitive valve 30 will be set to open as the ambient temperature drops too close to the freezing point and to remain open as the temperature drops below the freezing point until a return of ambient temperature to a point safely above freezing permits the valve again to close. By way of illustration, a valve may be set to start to open at about 40°F and become fully open at about 34°F, remaining open until the temperature again rises above 34°F whereupon the valve automatically closes.

The amount of discharge through hose 32 when the valve 30 is fully open will depend upon the size of the piping system being protected and the amount of flow of water therein required to prevent freezing during exposure to sub-freezing temperatures. In general, a shower provided with 1½ inch piping in the vertical section 11 and horizontal section 13 should have a drain of about 6 gallons per minute at a 60 psi line pressure in the system in areas wherein ambient temperature may drop as low as 0°F, and a somewhat higher flow if temperatures substantially below 0°F are likely to be encountered. It is understood, however, that these approximate figures are given merely by way of illustration as those planning for installations in particular localities can readily determine the conditions to be satisfied.

The temperature sensitive valve 30 constitutes an important adjunct to a safety shower equipped with heating means such as the induction heating 22 or resistance heating 23 to provide protection in the situation where a power failure may render the heating means inoperative. Not only could such power failure render the shower non-functional at sub-freezing temperatures without the temperature sensitive bleed valve 30 being present, but freezing of water in the piping could also lead to rupture of the piping or fittings necessitating expensive repairs and prolonged shutdown of the safety shower.

The inclusion of the temperature sensitive bleed valve 30 is also extremely desirable in safety showers installed in areas, such as southern portions of the United States, where freezing temperatures occur so infrequently that the provision of heating cannot be economically justified, and yet where the freak occurrence of freezing conditions has in the past created serious problems with safety shower equipment. In such situations the presence of the temperature sensitive bleed valve 30 automatically creates a limited flow of water through the piping throughout the duration of a freak cold spell thereby maintaining the shower operative and preventing the possibility of damage due to freezing.

Another adaptation of the present invention particularly useful in tropical and sub-tropical areas is to incorporate valve 30 in which the temperature sensor is set to open the valve when the ambient temperature reaches some elevated level such as 120° to 150°F permitting overheated water to drain from the piping. In such event the valve would automatically close as soon as the hot water had been drained from the system and the temperature of the water passing through the valve dropped again below the pre-set temperature. This is considered to be an important safety factor since it is known that in tropical and sub-tropical areas where showers are exposed to full sunlight the water temperature, even in thermally insulated piping, can reach dangerously high levels.

In some localities such as southern portions of the United States, it is possible to encounter both extremes of temperature, sub-tropical at times in the summer, and below freezing occasionally in the winter. In such locations, therefore, it is desirable that the shower be equipped with two temperature sensitive valves 30, one functioning as a bleed valve as the ambient temperature approaches freezing, and the other functioning as a bleed valve when a pre-determined elevated ambient temperature is reached. Such second temperature sensitive valve 30 can readily be visualized in conjunction with FIG. 3 of the drawing as disposed to the left of the pipe 13 and connected therewith through a second lateral extension in axial alignment with extension 29.

The bleed valve or valves 30 function to provide circulation of water through the piping substantially to the points controlled by valves 24 and 26. This still leaves the problem of the conditions of water which may remain in the piping beyond the valves 24 and 26, since freezing or overheating in either of these areas can be equally objectionable. It is therefore desirable to include in the piping 16' leading to the nozzles 33 of the eyewash head 17 a small diameter weep hole having associated therewith a short length of hose or tubing 34. For example, a weep hole 1/16th inch in diameter registering with a ½ inch plastic tubing will not divert appreciable flow of water when the eyewash is activated, yet immediately after use of the eyewash water can drain substantially completely from the piping 16'.

While the weep hole and discharge tubing 34 have been shown with respect to a particular eyewash structure having spaced and convergently directed nozzles 33, it is to be understood that the principle can be incorporated with any type of eyewash head, the important thing being that the weep hole and discharge is the low point of the piping system.

Whether or not water will drain from the piping section 13' beyond valve 23 will depend on the nature of the spray head 15 employed; and with some sprayheads the piping 13' would empty by gravity within a short period after any use of the shower. In instances where such drainage did not automatically take place, however, it would be desirable to include in the piping section 13' a weep hole and registering hose or tube 35 to assist in draining of the piping. In this instance the weep hole and tube 35 might function more as an air vent facilitating the gravity flow of water from the piping 13' through the showerhead 15.

Temperature sensitive valves, such as the valve 30 shown in the drawing, can respond either to ambient air temperature or internal water temperature, and while either type can be adapted in the safety shower the valve 30, as illustrated, is intended to be unresponsive to changes in water temperature.

It will be noted, in this connection, that the housing portion 19' contains none of the insulating material 20 as shown in FIG. 3, so that the valve 30 and the water therein and in the short length of uninsulated piping leading thereto will respond more quickly to changes in ambient temperature than will water in insulated portions of the piping 11, 13 and 29. This tends to provide added protection to the system whether the valve 30 is one set to open as the temperature drops toward freezing, or one set to open when the temperature becomes excessively high.

Various changes and modifications in the all weather safety shower as herein disclosed may occur to those skilled in the art and to the extent that such changes and modifications are embraced by the appended claims, it is to be understood that they constitute part of the present invention.

I claim:

1. A safety shower comprising a piping system including a vertical portion leading from a constant water supply to an elevated horizontal portion terminating in a downwardly directed shower head, a quick actuating valve closely adjacent said shower head, control means for said valve readily accessible to an individual beneath said shower, an ambient temperature sensitive bleed valve assembly closely adjacent and in advance of said quick actuating valve, said bleed valve assembly further having a bleed valve containing valve actuating means which respond to said sensor to open and close said bleed valve at predetermined ambient temperatures, said temperature sensitive bleed valve being set to open as ambient temperature reaches and exceeds predetermined depressed or elevated levels, thereby providing a limited flow of water through the piping system in advance of said quick actuating valve while the shower is not in use, upon and during occurrence of said predetermined depressed or elevated ambient temperature levels.

2. A safety shower as defined in claim 1 wherein said temperature sensitive bleed valve assembly is of the low temperature type, and is set to automatically open as ambient temperature drops to and below a temperature of the order of two degrees above the freezing point and to remain open until the ambient temperature again rises above said pre-set temperature.

3. A safety shower as defined in claim 1 wherein said temperature sensitive bleed valve assembly is of the high temperature type, and is set to open as ambient temperature rises to and above a predetermined temperature within the range of 120°–150°F and to remain open until the water passing through the valve has dropped below said pre-set temperature.

4. A safety shower as defined in claim 1 wherein two temperature sensitive bleed valve assemblies are employed in close proximity in said quick actuating valve, one of said temperature sensitive valve assemblies being of the low temperature type and being set to type, open as ambient temperature drops to and below a temperature of the order of two degrees above the freezing point and to remain open until the ambient temperature again rises above said pre-set temperature, and the other of said temperature sensitive bleed valve assemblies being of the high temperature type, and being set to open as ambient temperature rises to and above a predetermined temperature within the range of 120°–150°F and to remain open until the water passing through the valve has dropped below said pre-set temperature.

5. A safety shower as defined in claim 1 wherein the piping system beyond said quick actuating valve is provided with a weep hole and associated drain tubing facilitating drainage of water from the showerhead when the shower is not in use.

6. A safety shower as defined in claim 1 wherein said piping system is encased in a thermally insulated jacket, and means is provided longitudinally of said piping system for applying heat thereto as ambient temperature approaches the freezing point.

7. A safety shower as defined in claim 6 wherein said heat applying means comprises thermostatically controlled induction heating means.

8. A safety shower as defined in claim 6 wherein said heat applying means comprises thermostatically controlled resistance heating means.

9. A safety shower as defined in claim 1 wherein said piping system includes, at a convenient height below said horizontal portion, a branch line terminating in an eyewash head, said branch line including a quick actuating valve closely adjacent said eyewash head.

10. A safety shower as defined in claim 9 wherein said branch line, beyond said quick actuating valve, is provided with a weep hole and associated tubing to facilitate drainage of water from said eyewash head when the eyewash is not in use.

* * * * *